United States Patent
Sharma et al.

(10) Patent No.: US 6,892,067 B1
(45) Date of Patent: May 10, 2005

(54) SCRIPT BASED INTERFACES FOR MOBILE PHONES

(75) Inventors: Dipanshu Sharma, Helsinki (FI); Yossi Ginzboorg, Haifa (IL)

(73) Assignee: Nokia Corporation, Espoo (FI)

(*) Notice: Subject to any disclaimer, the term of this patent is extended or adjusted under 35 U.S.C. 154(b) by 0 days.

(21) Appl. No.: 09/475,756

(22) Filed: Dec. 30, 1999

(51) Int. Cl.⁷ .............................................. H04M 3/00
(52) U.S. Cl. ..................... 455/419; 455/418; 455/420; 455/414.1; 345/762; 345/763
(58) Field of Search ............... 455/418, 414.1, 455/420, 550.1, 422.1, 566, 419, 68, 70; 709/217, 216, 218; 345/762, 763

(56) References Cited

U.S. PATENT DOCUMENTS

| | | | | |
|---|---|---|---|---|
| 5,931,906 A | | 8/1999 | Fidelibus, Jr. et al. | 709/217 |
| 5,953,652 A | * | 9/1999 | Amin et al. | 455/410 |
| 6,070,199 A | * | 5/2000 | Axtman et al. | 361/686 |
| 6,088,340 A | * | 7/2000 | Buchholz | 370/310 |
| 6,104,924 A | * | 8/2000 | Shirai | 455/418 |
| 6,154,646 A | * | 11/2000 | Tran et al. | |
| 6,199,099 B1 | * | 3/2001 | Gershman | 709/203 |
| 6,223,291 B1 | * | 4/2001 | Puhl et al. | 713/201 |
| 6,223,292 B1 | * | 4/2001 | Dean | 713/202 |
| 6,226,516 B1 | * | 5/2001 | Gupta et al. | 379/201.05 |
| 6,288,641 B1 | * | 9/2001 | Casais | 340/539 |
| 6,311,058 B1 | * | 10/2001 | Wecker et al. | 455/418 |
| 6,356,529 B1 | * | 3/2002 | Zarom | 370/231 |
| 6,368,273 B1 | * | 4/2002 | Brown | 128/904 |
| 6,370,389 B1 | * | 4/2002 | Isomursu et al. | 455/414 |
| 6,430,624 B1 | * | 8/2002 | Jamtgaard et al. | 709/246 |
| 6,446,096 B1 | * | 9/2002 | Holland et al. | 707/513 |
| 6,449,638 B1 | * | 9/2002 | Wecker et al. | 709/217 |
| 6,463,534 B1 | * | 10/2002 | Geiger et al. | 713/168 |
| 2001/0012779 A1 | * | 8/2001 | Skog | 455/436 |
| 2001/0016487 A1 | * | 8/2001 | Hiatt, Jr. | 455/420 |

FOREIGN PATENT DOCUMENTS

| | | | |
|---|---|---|---|
| EP | 0838768 | 4/1998 | G06F/17/30 |
| WO | 9859282 | 12/1998 | |
| WO | 9952032 | 10/1999 | G06F/9/44 |
| WO | 9959283 | 11/1999 | |

OTHER PUBLICATIONS

"Specification of the Bluetooth System; Wireless connections made easy; Core; v1.OB" Bluetooth Specification Version, XX, XX, vol. 1, Dec. 1, 1999, pp. 495–516.

Tomisha Kamada et al.: "Compact HTML for Small Information Appliances" W3C, Feb. 9, 1998.

* cited by examiner

*Primary Examiner*—Erika Gary
*Assistant Examiner*—Huy Nguyen
(74) *Attorney, Agent, or Firm*—Antonelli, Terry, Stout & Kraus, LLP

(57) ABSTRACT

A mobile phone utilizes a script based user interface. The script is stored in memory of the phone and is adapted to cause a browser to utilize one of a plurality of internal features in order to perform a function, and to display a user interface for the function on the display of the phone. Information is transferred between mobile communication devices by organizing the information as a script. The mobile communication device processes the script and performs a function prescribed by the script when it is received. In a method of real-time wireless communication, a WML script defining a user interface is sent from a first mobile device to a second mobile device. A data file is set up in the second device in response to the WML script information. Real-time script information is then repeatedly sent from the first device to the second device. The user interface is displayed on the second device and a function is performed in response to the real-time script information.

21 Claims, 7 Drawing Sheets

```
<WML>
    <CARD NAME="card1" TITLE="Search Name" NEWCONTEXT="TRUE">
    Enter Name:<INPUT    FORMAT="#N"   KEY="name"  TITLE="Enter" Name."
DEFAULT="NULL"/>
        <BR/>
        <DO TYPE="ACCEPT" LABEL="Search">
            <GO URL="search wmlsc#name('$(name))")">
                <VAR NAME="name" VALUE="name"/>
            </GO>
        </DO>
        <DO TYPE="HELP" LABEL="Help">
            <GO URL="#help"/>
        </DO>
    </CARD>
    <CARD NAME="help" TITLE="Help">
        <U>NAME</U>-$Text string not more than 30 chars.<BR/>
        <DO TYPE="PREV" LABEL="Back">
            <PREV/>
        </DO>
    </CARD>
</WML>
```

```
<WML>
    <CARD NAME="card1"TITLE="Music System"NEWCONTEXT="TRUE">
        Volume:<INPUT    FORMAT="#N"    KEY="Volume"    TITLE="Volume"
DEFAULT="NULL"/>
        <BR/>
        <DO TYPE="ACCEPT" LABEL="Up">
            <GO URL="up.wmls">
                <VAR NAME="Volume" VALUE="volume"/>
            </GO>
        !!this input is sent to the corresponding device using bluetooth
        </DO>
        <DO TYPE="Down" LABEL="Down">
            <GO URL="#Down"/>
        !!this input is sent to the corresponding device using bluetooth
        !!in return another card is received which is then displayed by the browser.
        </DO>
    </CARD>

</WML>
```

FIG. 10

```
<WML>
<CARD NAME="card1"TITLE="Music System"NEWCONTEXT="TRUE">
<U>
        Song: Devil Within...
</U>
<BR/>
<U>
        Lyrics: <REALTAG File="realfile.dat"Width=23> </REALTAG>
</U>
<BR/>
<DO TYPE="ACCEPT" LABEL="Options">
    <GO URL= "options.wmls">
        <VAR NAME="Options"VALUE="Options"/>
    </GO>
</DO>
<DO TYPE="Back" LABEL="Back">
    <GO URL= "#Back"/>
</DO>
```

SCRIPT BASED INTERFACES FOR MOBILE PHONES

BACKGROUND

1. Field of the Invention

The present invention relates generally to mobile communication devices. Particular aspects of the invention relate to a script based user interface for a mobile phone, a method of transferring information between mobile communication devices, and a real-time user interface for communication between different mobile communication devices.

2. Discussion of the Related Art

Mobile phones have been growing rapidly in computing power and can now perform many functions in addition to voice telephony. These functions include, for example, a phonebook, calendar, alarm clock and calculator. Modern mobile phones have also become more personalized. For example, owners can select features, ringing tones and menu layout. They can also access remote data services, such as banking, stock quotes and weather forecasts, with Short Messaging Service (SMS) and Wireless Application Protocol (WAP).

The main feature of SMS smart messages is their ability to allow easy access to remote SMS services. But they also allow the user to configure some functions on their phones. For example, they can be used to download ringing tones and service menus from SMS servers. Unfortunately, they don't allow access to all of the phone functionality and users can only perform limited tasks with smart SMS messages.

A particular shortcoming of SMS messages is that they do not eliminate the need to develop a User Interface (UI) in a low-level language. Unlike personal computers, mobile phones typically have unique internal technology and associated tools for generating user interfaces in a somewhat automated manner. For an example of a conventional low-level user interface, see GUI 18b in U.S. Pat. No. 5,790,974. Some mobile phone technologies may have pre-compiled graphical user interfaces, thus allowing only limited personalization options. Furthermore, although software applications in the personal computer environment use HTML and JavaScript for user interfaces accessed through a browser, the software available for user interfaces in a mobile phone can sometimes be written in a relatively uncommon language and programmers may have difficulty working with that language.

Consequently, even though a user interface for a mobile phone may be relatively simple, developing a user interface for each new function in the phone requires many resources and a great deal of work, since it involves low level programming and is a real-time system. Customizing the phone user interface for personal preferences is almost impossible. It is limited to certain functions, and depends on the phone's internal architecture.

One attempted solution to these problems is MExE developed by ETSI's Special Mobile Group (SMG) 4: Data Services as an "advanced platform for terminal based telecommunication services". At the core of MexE is a Java Virtual Machine running on the mobile device. Functionality is achieved by Java applications that are either resident on, or downloaded to, the mobile device. MExE is designed as a full application execution environment and also supports phone features, like call control and SIM access. MExE also uses WAP's WTAI to access the phone's telecommunication functions, like call control, SMS and battery status. However, MExE is not feasible for many phones because it requires a great deal of processing power and memory.

There are also difficulties with current methods of transferring data between mobile devices, such as infrared (IR) and Bluetooth, that have underlying protocols which define standard ways to transfer the data. These methods do not define a protocol that works at the uppermost data layer and is understood by both devices. While data files can be transferred between mobile devices via Bluetooth, no standardized way exists to transfer real time information from one mobile device to another mobile device which is the same or different than the first mobile device.

BRIEF SUMMARY

The present invention addresses mobile communicating devices which are disadvantageous for at least the reasons recognized above. There are several different aspects to the invention, any one of which may be practiced without the others.

One aspect of the present invention is directed to a script based user interface for a mobile phone. The script is stored in memory of the phone and is adapted to cause a browser to utilize one of a plurality of internal features in order to perform a function, and to display a user interface for the function on the display of the phone.

Another aspect of the invention involves a method of transferring information to a mobile communication device from a remote location. The information is organized as a script transferred over a connection from the remote location to the mobile communication device. The mobile communication device processes the script and performs a function prescribed by the script when it is received.

In another aspect of the invention, real-time wireless communication is achieved between first and second mobile communication devices. First, a WML script defining a user interface is sent from the first device to the second device. A data file is set up in the second device in response to the WML script information. Real-time script information is then repeatedly sent from the first device to the second device. The user interface is displayed on the second device and a function is performed in response to the real-time script information.

DETAILED DESCRIPTION

The foregoing and a better understanding of the present invention will become apparent from the following detailed description of example embodiments and the claims when read in connection with the accompanying drawings, all forming a part of the disclosure of the invention. While the foregoing and following written and illustrated disclosure focuses on disclosing example embodiments of the invention, it should be clearly understood that the same is by way of illustration and example only and is not to be taken by way of limitation, the spirit and scope of the present invention being limited only by the terms of the claims in the patent issuing from this application.

One exemplary embodiment of the present invention seeks to provide a method of creating a user interface for mobile phones, by using a markup language and a scripting language with a general-purpose browser/interpreter. One possible application of the exemplary embodiment of the invention uses the Wireless Access Protocol (WAP) recently introduced mainly as a way to access remote data from handheld mobile devices, like mobile phones and pagers. The core of WAP is WML and WMLScript, which are interpreted by using a WML micro-browser resident on the mobile device. The current standards of WAP have limited access to the phone's local functions through the WAP Telephone Access Interface (WTAI). The invention of course is not limited to such a specific WAP application. It is more broadly directed to a diverse set of script based user interfaces for mobile phones.

Mobile Phone Architecture

Figure 1:
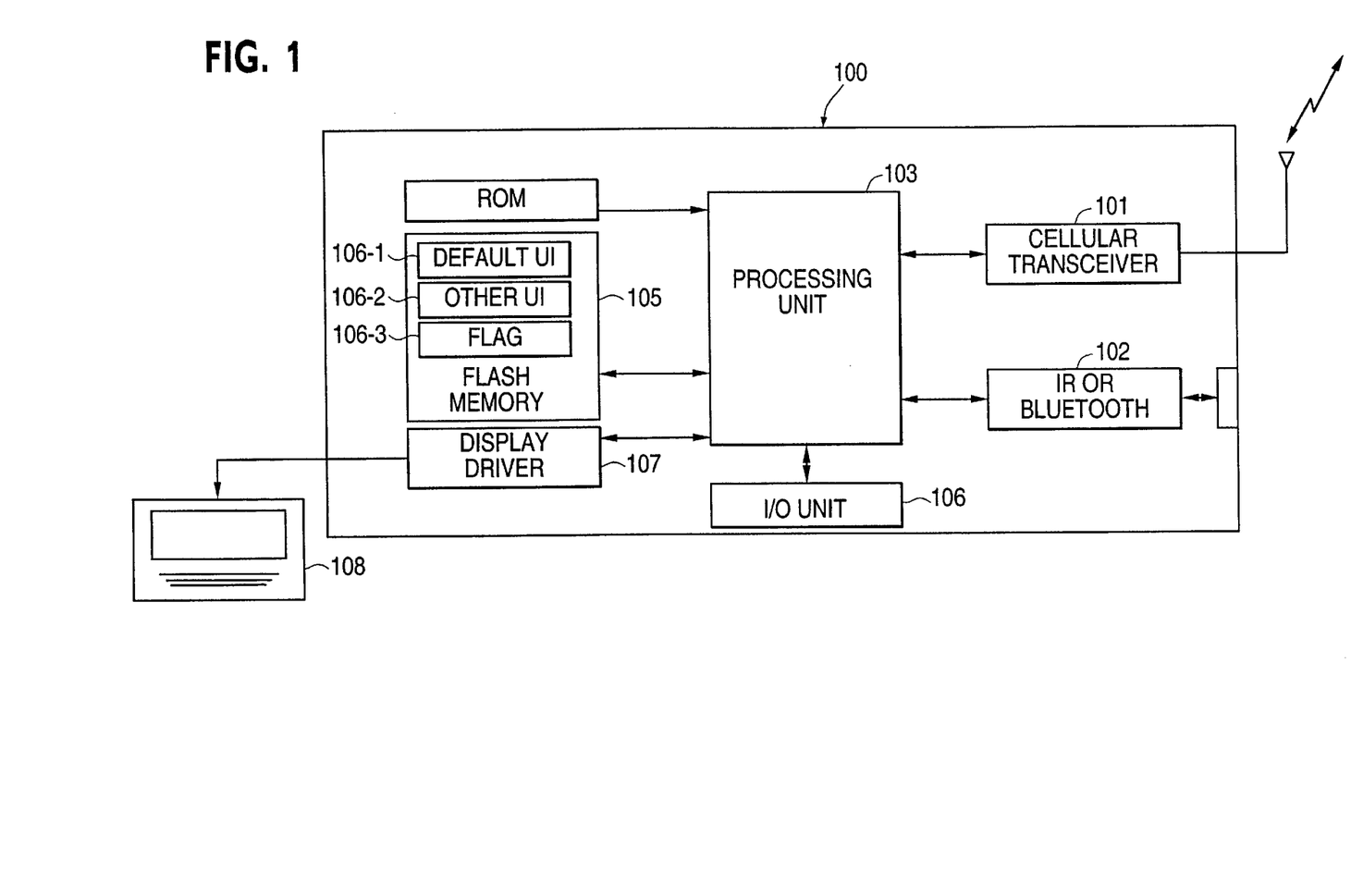
FIG. 1 is a generalized block diagram of a mobile phone having a display according to one aspect of the invention.

A block diagram of the possible architecture of a mobile phone having a script based user interface according to an exemplary embodiment of the invention is shown in FIG. 1. It should be understood that the invention is not limited to a mobile phone having such an architecture.

The mobile phone 100 has a standard cellular transceiver 101 connecting it to a cellular communication network (not shown) and a standard infrared (ir) or Bluetooth wireless port 102 enabling it to directly receive data from another device via a wireless connection. A processing unit 103 is connected to a read-only memory (ROM) 104, a flash memory 105, an input/output unit 106, and a display driver 107 connected to display 108. Although display 108 is shown separately in FIG. 1 for simplicity, it is preferably formed integrally with the mobile phone. A variety of software applications are included and stored in ROM 104 or flash memory 105 of mobile phone 100, but are not shown in FIG. 1 for the sake of convenience. In an exemplary embodiment of the invention, flash memory 105 includes a default user interface script 105-1, at least one alternative user interface script 1052, and a flag or register 105-3 indicating the active user interface script.

Figure 2:
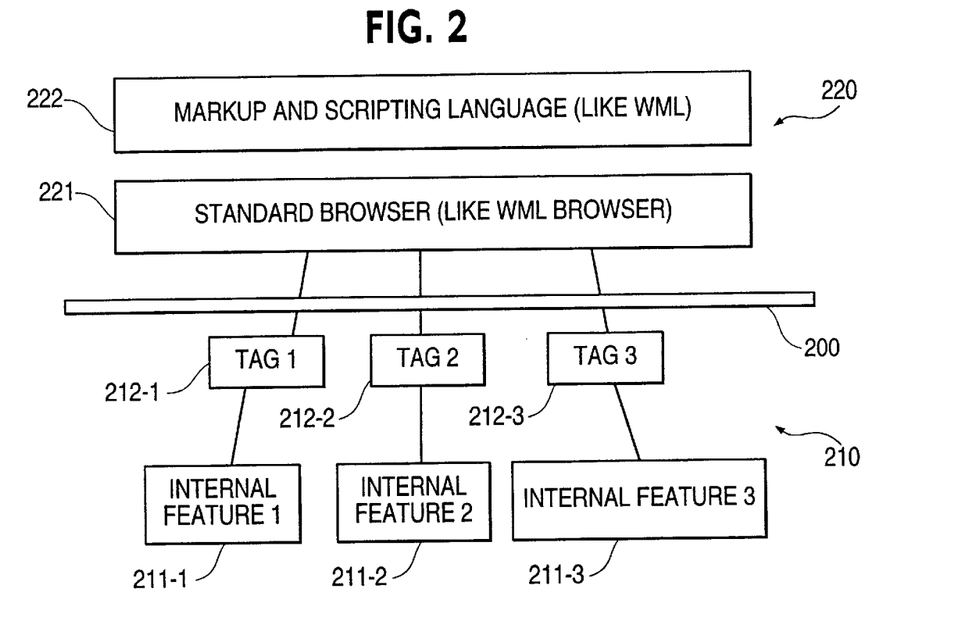
FIG. 2 is a conceptual diagram useful for illustrating the major software elements of a mobile device according to an exemplary embodiment of the invention.

As shown in FIG. 2, the software of mobile phone 100 has a kernel space 210 and a software application space 220 separated by line 200. The kernel space 210 may be composed of hardware, firmware and/or an operating system. In any case, it has a plurality of internal features 211-1 to 211-3, each internal feature providing a unique functionality application. The functionality applications are preferably pre-compiled using a low level language like C. A plurality of tags 212-1 to 212-3 are each associated respectively with internal features 211-1 to 211-3. Although three internal features and associated tags are shown in FIG. 2, a mobile phone may have any number of internal features and associated tags.

A browser 221 in software application space 220 communicates with internal features 211-1 to 211-3 and other parts of kernel space 210 via corresponding predefined tag handling sub-routines (not shown). The markup language and scripting language 222 run on top of browser 221. They access the functionality of internal features 211-1 to 211-3 by special tags (not shown) in the scripting language (e.g., a CALL tag in WML Script).

A user interface is created by writing a script that uses the functionality of one of internal features 211-1 to 211-3. Tags can be added to scripts to provide fuller functionality. The scripting language 222 draws a user interface on the display of the device as per the script. Use of the script gives computational power to the interface, thus making it possible to accept input from the user and to compute based on the input. In essence, each user interface is a script page.

User Interface

Figure 3:
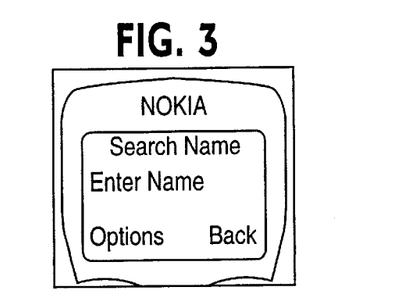
FIG. 3 shows an exemplary user interface shown on the display of a mobile device when searching for a name according to an embodiment of the invention.
Figure 4:
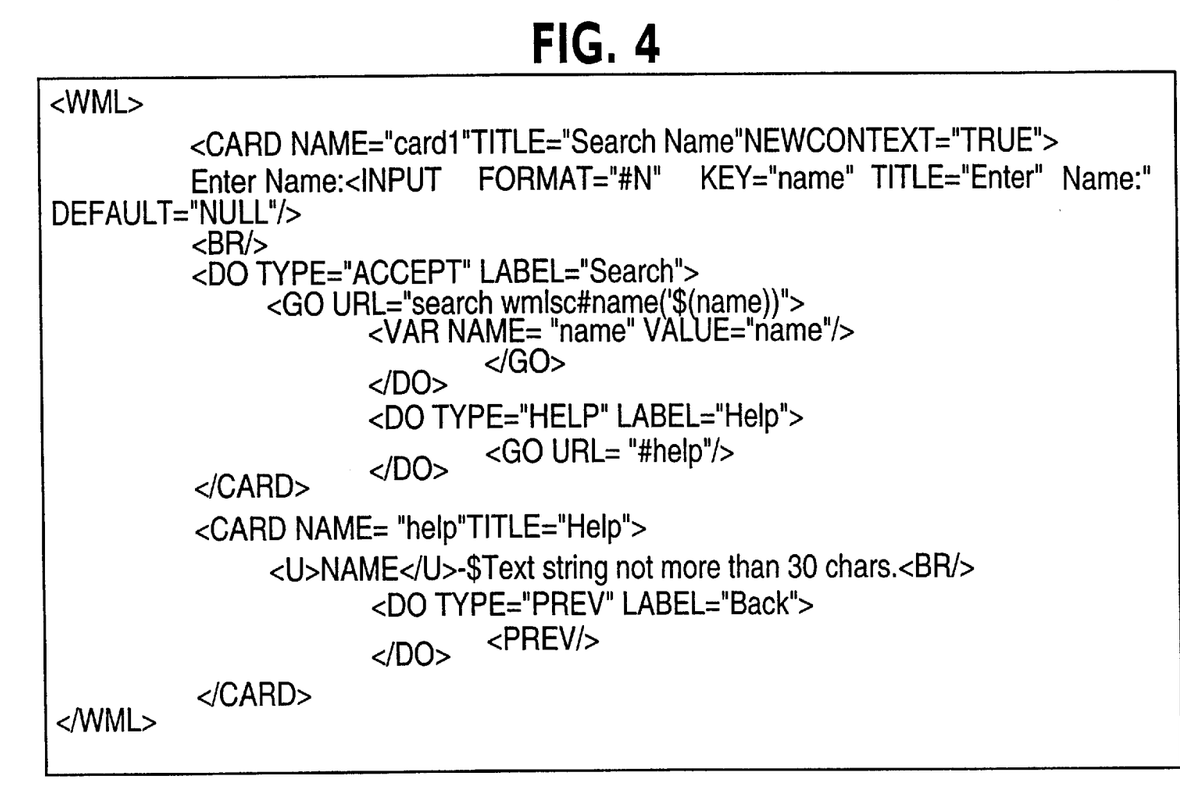
FIG. 4 is an exemplary WML Script for creating the user interface shown in FIG. 3.

FIGS. 3 and 4 show examples of a user interface and a WML Script carrying out the function of searching for a name. Other functions can be provided by adding corresponding tags and internal features and then writing scripts which call those tags and internal features. These functions can include, but are not limited to, IR connectivity, ringing tones, SIM card, settings, local calendar and alarm clock and call register, etc.

Although not necessary, it is preferred that a standard scripting language, like Java Script or WML Script, be used to create the user interface. A standardized scripting language avoids the cost and delay of developing a special language, and of teaching developers the new language. It also has the natural advantage of reducing UI development time and cost.

WML and WML Script are preferred scripting language choices since they were originally developed for mobile communicating devices. Their code is compact and the machine that runs WML Script is fast and simple. However, one drawback to using WML is that while it provides some access to the phone's function through WTAI, more tags have to be defined and added to access more functions. As an alternative, a proprietary scripting language can be used for the user interfaces. It preferably includes a set of standard functions and tags, and special tags to access the manufacturer's specific device's functions.

An embodiment using a standardized scripting language also advantageously permits the use of commercially available development tools. Using a standard scripting language allows UI development with commercially available tools, such as Nokia's WAP SDK and Unwired Planet's UP.SDK. Commercially available tools are more reliable and convenient tools than proprietary tools because of their large user base.

Another main advantage of the invention is that user interfaces can be easily customized to a user's special requirements and then recorded in a flash memory. For example, a common carrier, giving phones to agents, could have its phone numbers available in a special, separate menu, displayed before all other menus.

Other features, like images, can be more easily utilized in the UI to improve the look and feel with minimal development effort. Scripting languages are high level and easy to program. Most programmers know at least one scripting language, be it JavaScript, Perl or WML Script, so the learning time for a new UI programmer is relatively short.

The invention also has the advantage of allowing architecture independent UI development and platform independent UI development. Since the script is written in a high level language, it can be run on any terminal that has a browser for it regardless of the underlying architecture. The same UI script can be reused for different devices and different architectures.

The invention also changes the development model for the mobile phone by segmenting the development structure. In particular, the invention divides the structure of application development for mobile terminals into three main segments. The first segment consists of UI developers skilled in UI design and high level scripting languages. The second segment consists of browser developers developing the interface between the UI and the phone's functionality. The third segment consists of function developers specializing in phone internals. In Nokia's ISA architecture, the function developers are programming servers. This segmentation allows developers to develop expertise in one field. This is advantageous in mobile phones having growing functionality, where applications are becoming more complicated.

The segmentation of the software allows the process of functionality (and possibly browser) development to be carried out by the manufacturer of the mobile phone, while the high level scripting language allows the UI development to be outsourced without disclosing any proprietary technologies and architecture.

Selection of User Interface

In addition to customizing and personalizing the user interface, the invention also makes it easier for a user to select and change their user interface. A mobile phone according to an exemplary embodiment of the invention has two (possibly more) reserved storage areas in FLASH memory for UI scripts. One storage area is for a default script, such as the previously mentioned company sponsored UI having preferred phone numbers. The other storage area(s) is for an alternative customized or personalized script. In an alternative embodiment, the default script can be stored in read-only memory (ROM) instead of flash memory. A flag is also kept, preferably in the phone's storage, indicating which UI script is selected for use. The browser allows the user to select the default UI or customized UI.

Figure 5:
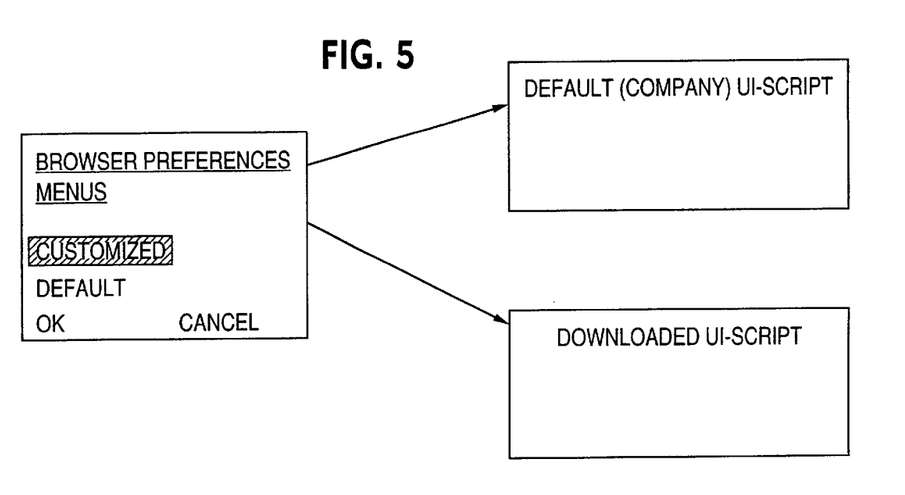
FIG. 5 is a diagram illustrating the selection and downloading of different user interface scripts.

It is possible to have one or more of the scripts downloaded to the phone. See FIG. 5. Downloading permits the user to personalize the UI look and functions according to their own preferences. To prevent security problems, a script source authentication mechanism and user's approval for potential security violating function activation can be provided.

Script Transfer

In a further embodiment of the invention, the mobile device is configured to send and receive scripting data to another mobile device via Bluetooth or similar technology. These mobile device is not a mobile phones as in the previous embodiments, but may instead be a laptop or desktop computer, printer, personal data assistant (PDA), facsimile machine, keyboard, joystick, music system or radio, etc.

Figure 6:
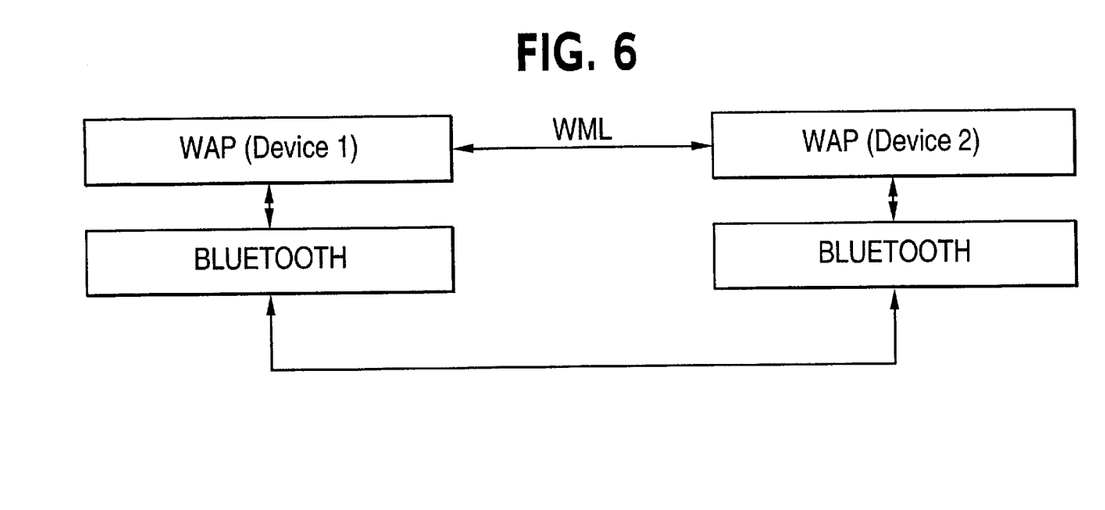
FIG. 6 illustrates an architecture for the transfer of information between mobile communication devices.

This further embodiment combines WAP with Bluetooth, and uses scripts (such as WML) as a standard for information transfer between the mobile devices. FIG. 6 shows the architecture of the information transfer as a WAP protocol running on top of Bluetooth to support the transferred scripts. The information transferred between the devices is typically a WML page.

Figure 7:
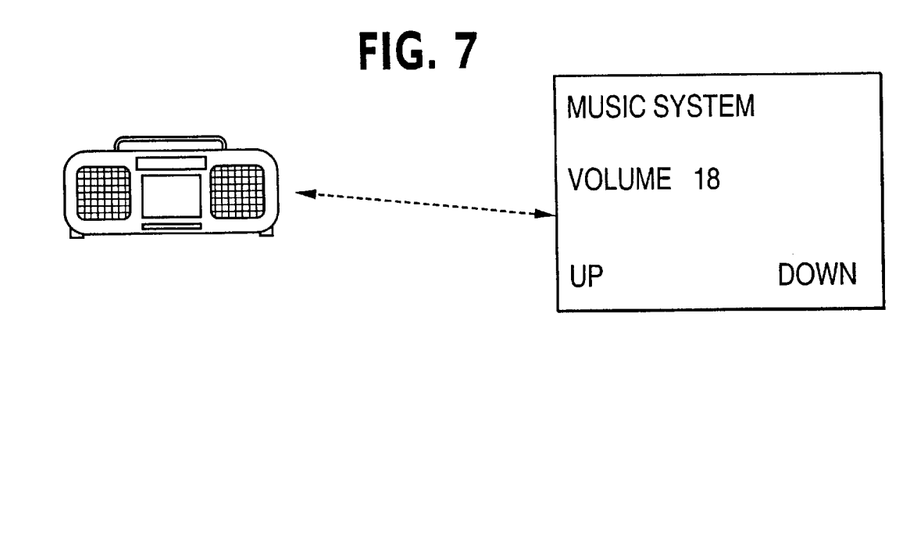
FIG. 7 graphically illustrates the transfer of a user interface to a Bluetooth enable music system.
Figure 8:
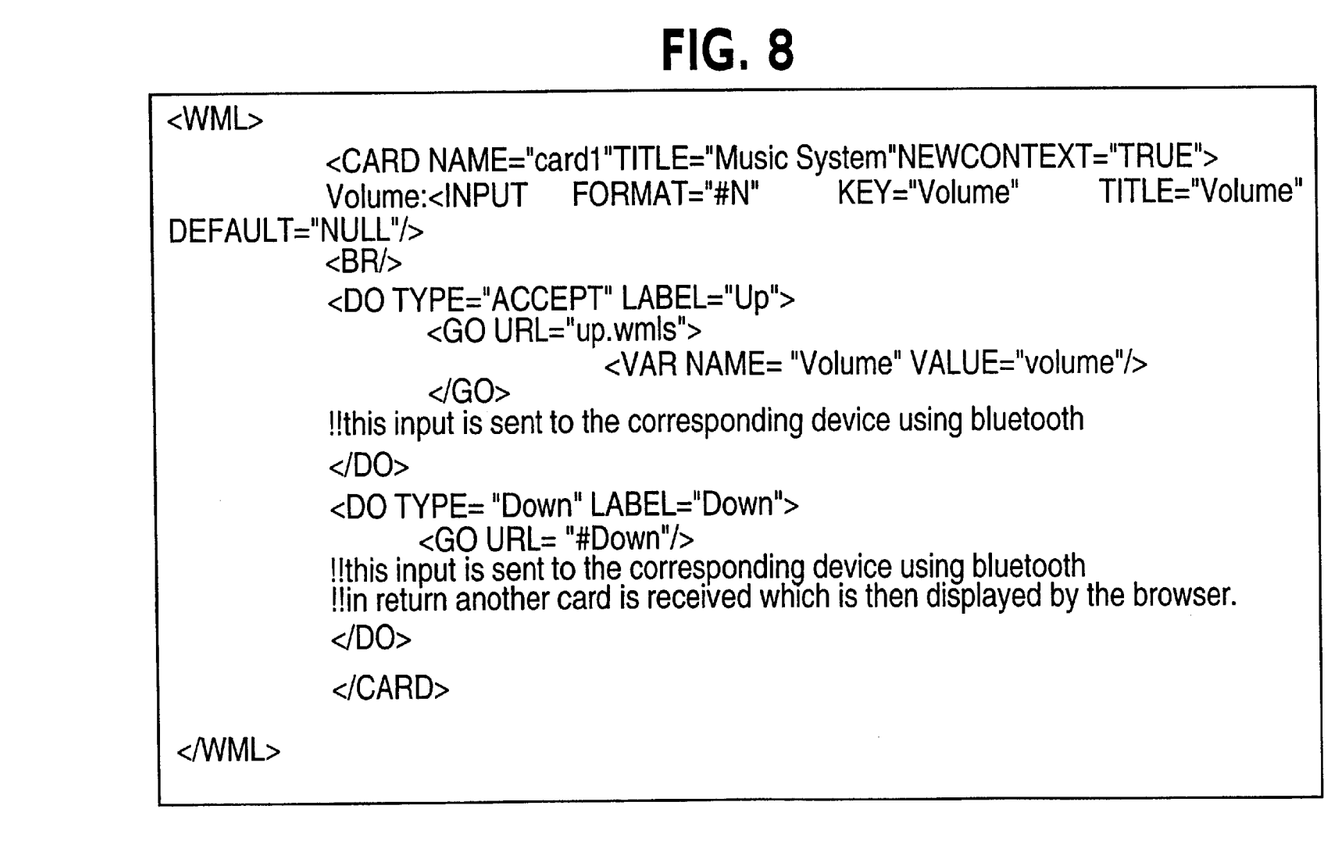
FIG. 8 is a WML script whereby a user interface is transferred from the system in FIG. 7.

FIG. 7 graphically illustrates the transfer of a user interface to a Bluetooth enabled music system. This is done by sending a WML script to the music system. FIG. 8 shows a WML script whereby the user interface is transferred from one mobile device to another. When WML Script 800 is received, the receiving mobile device (music system) can then increase or decrease the volume. The two mobile devices communicate with each other via the Bluetooth technology and one device is able to manipulate the features of the other device. The script is then displayed using the browser. All actions on the script (i.e., volume up and down) are sent back to the music system. The music system then responds to the actions. The only information transferred are standard scripts understood by both devices.

Of course, the invention may be applied to any audio, video or multimedia device. In addition to volume control, the device preferably is able to carry out all of the conventional control functions of such a device. For example, various transferred scripts could implement the functions of PLAY, STOP, REWIND, FORWARD, FAST FORWARD and FAST REWIND, etc., in the same manner as a conventional device. In addition, a remote access system can be included so that the mobile phone or other terminal equipment can be remotely accessed by control signals included in appropriate script information to, for example, turn the equipment on and off or at least contact the equipment while it is operating is a suspended mode of operation.

This exemplary embodiment offers the advantage of interaction between heterogeneous devices. The mobile devices are able to communicate with each other using standard scripts. As the scripts and browser are standard, specifications exist to make it easy to develop products that can interact with heterogeneous devices. The scripts which are transferred from one device to another, contain functionality that can be manipulated. Much more functionality can be achieved by the devices by providing device specific extensions to the scripts. The browser is designed so that the scripts are not able to mishandle the internals of the device thus making it safe to use the scripts.

Real Time Information Transfer

Figure 9:
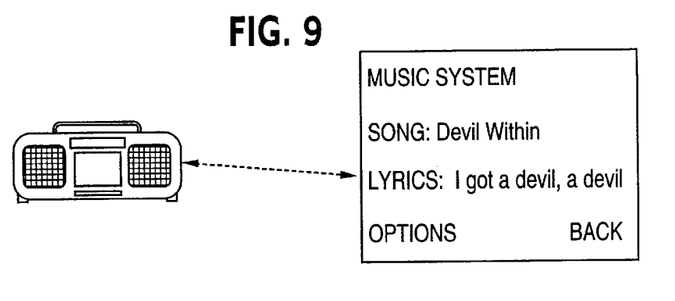
FIG. 9 graphically illustrates yet another embodiment of the invention in which real-time information is immediately transferred from a first device to a second device.

Another embodiment of the invention, graphically illustrated in FIG. 9, allows a Bluetooth enabled mobile device to immediately inform another mobile device of its current status. Specifically, a music system sends a main WML script and keeps on sending real data in a real-time file. The embodiment preferably uses the PUSH technology available as part of the WAP protocol. As an example a new tag is introduced:

<REALTAG File="realfile.dat" Width=23><\REALTAG>

REALTAG specifies the file and the width of the display. The data for the data file is constantly sent by the Bluetooth music system and is shown on the mobile in the allocated display space. The data is always represented in the form of WML scripts, which are displayed in succession as they are received.

Figure 10:
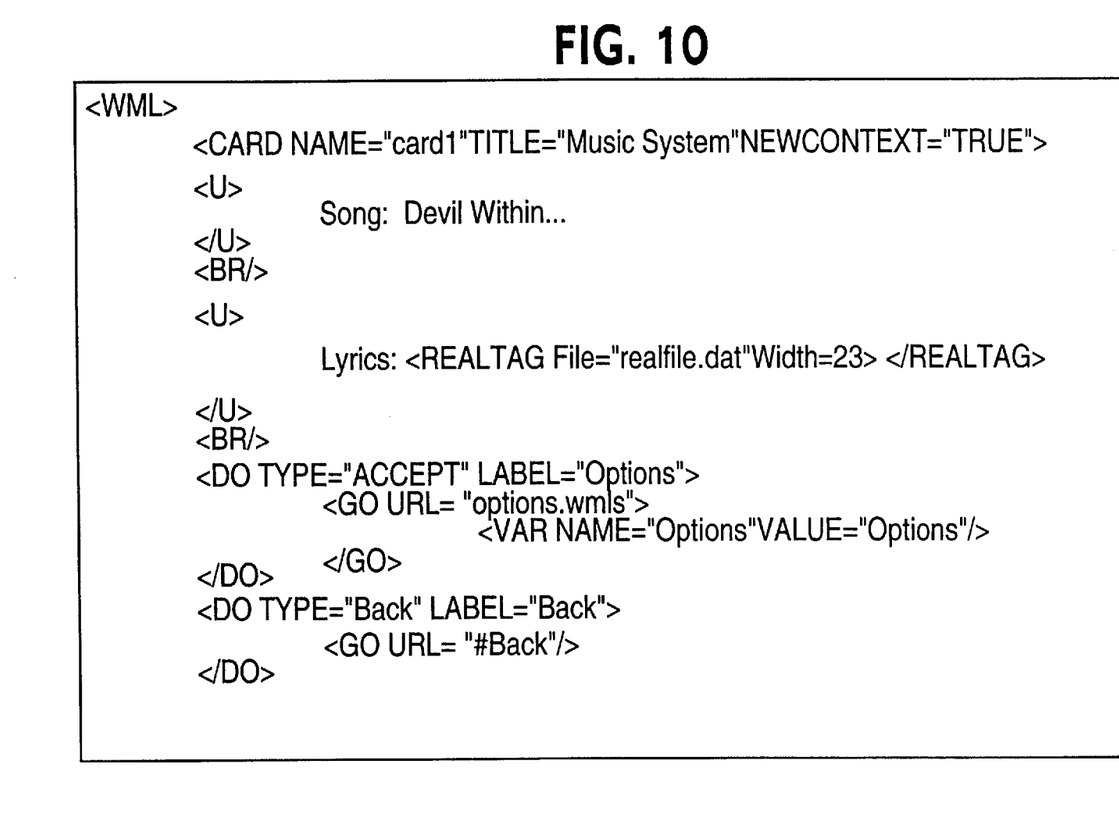
FIG. 10 is a WML script for a user interface displaying the lyrics of a song playing on the first device.

The current status of the device can always be obtained in this embodiment of the invention. The script example in FIG. 10 provides a user interface which shows that the music system is running a song, the title of the song and a lyrics section which is constantly updated in real-time as the song progresses. Of course, the embodiment is not limited to such applications.

While the foregoing has described what are considered to be example embodiments of the invention, it is understood that various modifications may be made therein and that the invention may be implemented in various forms and embodiments, and that it may be applied in numerous applications, only some of which have been described herein. It is intended by the following claims to claim all such modifications and variations.

What is claimed is:

1. A wireless communication device comprising:

a processing unit;

a memory connected to the processing unit;

a display connected to the processing unit;

a plurality of internal features, each feature providing a unique functionality application, said plurality of internal features being located in hardware, firmware and/or an operating system of the wireless communication device;

a cellular transceiver connected to the processing unit and adapted to communicate with another wireless communication device located at a remote location; and a browser application adapted to receive information through the cellular transceiver from the another wireless communication device and display said information on the display;

wherein, in response to said browser receiving a script relating to a predefined functions, the processing unit is adapted to forward said script into said memory for storing, and to cause said browser to utilize one of the plurality of internal features in order to perform the predefined function and to display a user interface for said predefined function, said wireless communication device adapted to perform a method of real-time wireless communication with the another wireless communication device located at the remote location, said method comprising:

receiving information included as a WML script from said another wireless communication device at the remote location, said WML script defining a user interface;

setting up a data file in response to said WML script information;

repeatedly receiving real-time script information from said another wireless communication device; and displaying said user interface and performing an internal function in response to said real-time script information.

2. The wireless communication device recited in claim 1, further comprising a plurality of tags located in said script.

3. The wireless communication device recited in claim 2, wherein the script causes the browser to utilize one of the internal features by calling upon the tag associated with said one of the internal features.

4. The wireless communication device recited in claim 1, wherein the browser is a WML browser and the script is a WML script.

5. The wireless communication device recited in claim 4, wherein the script causes the browser to display a user interface for a calendar function of the wireless communication device.

6. The wireless communication device recited in claim 4, wherein the script causes the browser to display a user interface for an internal phone book.

7. The wireless communication device recited in claim 4, wherein the script causes the browser to display a user interface for an alarm.

8. The wireless communication device recited in claim 4, wherein the script causes the browser to display a user interface for a message system.

9. The wireless communication device recited in claim 4, wherein the WML script causes the browser to display a use interface for an internal function, the internal function being a ringing tone, a SIM card, a device setting, a call register or an infrared connectivity.

10. A wireless communication device as recited in claim 1, wherein the real-time script information is pushed according to the Wireless Application Protocol and transferred using Bluetooth wireless transmission.

11. A wireless communication device as recited in claim 10, wherein said WML script provides a new tag for the data file.

12. A wireless communication device as recited in claim 11, wherein the real-time script information indicates the current status of the first wireless communication device.

13. A wireless communication device as recited in claim 1, wherein the wireless communication device is an audio device and the real-time script information is currently updated lyrics of a song playing on the audio device.

14. A method of real-time wireless communication between first and second wireless communication devices, said method comprising:

sending information included as a WML script from said first wireless communication device to said second wireless communication device, said WML script defining a user interface;

setting up a data file in said second wireless communication device in response to said WML script information;

repeatedly sending real-time script information from said first wireless communication device to said second wireless communication device; and displaying said user interface on said second wireless communication device and performing an internal function in response to said real-time script information.

15. A method as recited in claim 14, wherein the real-time script information is pushed according to the Wireless Application Protocol and transferred using Bluetooth wireless transmission.

16. A method as recited in claim 15, wherein said WML script provides a new tag for the data file.

17. A method as recited in claim 16, wherein the real-time script information indicates the current status of the first wireless communication device.

18. The method recited in claim 16, wherein the script causes the wireless communication device to perform an internal function, which is accessed by using a tag.

19. The method recited in claim 18, wherein the tag by which a manufacturer's specific function is accessed is not shown on the script of the user interface.

20. A method as recited in claim 18, wherein the first wireless communication device is an audio device and the real-time script information is constantly updated lyrics of a song playing on the audio device.

21. The method recited in claim 14, wherein the internal function of the wireless communication device is a ringing tone, a SIM card, a device setting, a call register or an infrared connectivity.

* * * * *